United States Patent [19]
Terry

[11] Patent Number: 5,565,997
[45] Date of Patent: Oct. 15, 1996

[54] DEVICE AND METHOD FOR DATA RECORDING AND/OR REPRODUCTING DATA MULTIPLEXED WITH VIDEO AND/OR AUDIO SIGNALS

[75] Inventor: Alan J. Terry, London, England

[73] Assignee: U.S. Philips Corporation, New York, N.Y.

[21] Appl. No.: 188,621

[22] Filed: Jan. 27, 1994

[30] Foreign Application Priority Data

Jan. 28, 1993 [GB] United Kingdom .................. 9301686

[51] Int. Cl.$^6$ .............................. H04N 5/76; H04N 7/00; H04N 11/00
[52] U.S. Cl. .............................................. 386/46; 348/468
[58] Field of Search .................................... 358/335, 310; 360/33.1, 461; 348/466, 467, 468; H04N 5/76

[56] References Cited

U.S. PATENT DOCUMENTS 5,237,412  8/1993  Nakajima ................................ 358/147

FOREIGN PATENT DOCUMENTS

| 0065378 | 11/1982 | European Pat. Off. . | |
|---|---|---|---|
| 2680440 | 2/1993 | France . | |
| 3920809 | 1/1991 | Germany . | |
| 52-16917 | 8/1977 | Japan | 358/147 |
| 57-58483 | 4/1982 | Japan | 358/147 |
| 58-181378 | 10/1983 | Japan | 358/147 |
| 3-22776A | 1/1991 | Japan | 358/147 |
| 2132856 | 7/1984 | United Kingdom . | |

OTHER PUBLICATIONS

Hirashima, "Teletext Receiver —A Circuit Design of the Sampling Clock Regeneration", 1980.
"Computer Controlled Teletext" J. R. Kinghorn, Electronic Components And Applications, vol. 6, No. 1, 1984.
"EBU Subtitling Data Exchagne Standard" A. AHL, EBU Technical Review, Summer, 1992P. 45–49.

*Primary Examiner*—Thai Q. Tran
*Assistant Examiner*—Y. Lee
*Attorney, Agent, or Firm*—Debra K. Stephens

[57] ABSTRACT

An arrangement for recording data, such as for example, teletext data, on standard domestic video recorders includes a teletext decoder and a microprocessor. The teletext decoder acquires selected teletext pages and passes them from its memory to the microprocessor over a bus as original standard teletex data packets. The microprocessor converts a teletext data packet into a plurality of data blocks, each of which is expanded to occupy a majority of an active line period. Thus the instantaneous data rate is reduced. The expanded data blocks are passed to video recorder circuitry via a shift register and switch. On replay, the microprocessor generates synthetic page and row headers to enable the teletext decoder to acquire data blocks from recording medium in the video recorder, as though the data blocks were standard teletext packets. The data blocks are then stored in the decoder memory and subsequently accessed by the microprocessor over the bus for conversion back to the original standard teletext data packets. These teletex data packets may then be fed to an associated television receiver or used for other purposes.

16 Claims, 5 Drawing Sheets

FIG. 5

DEVICE AND METHOD FOR DATA RECORDING AND/OR REPRODUCTING DATA MULTIPLEXED WITH VIDEO AND/OR AUDIO SIGNALS

BACKGROUND OF THE INVENTION

The invention relates to an arrangement for and a method of recording and/or reproducing data multiplexed with a television picture signal.

As is well known, data signals are broadcast during selected lines in the vertical blanking interval of television signals, this service being known as teletext in Europe. The data rate of these signals is such that they cannot reliably be recorded on standard domestic video recorders (VCR) because of the restricted bandwidth, and even with "Hi-band" such as S-VHS recorders there can be reproduction problems caused by timing errors.

Much of the information contained within this data as transmitted is ephemeral and consequently, there would be little demand for it to be recorded along with the picture information. For example, if a transmitted program is recorded for later viewing this viewing may not take place for a period of several days or even possibly weeks. As a result transmitted information such as weather forecasts or travel information would be of no interest when the recording was replayed. There are, however, some classes of data transmitted which retain their usefulness over long periods or even indefinitely. One of these is the transmission of subtitles, for example for the hard of hearing. It is of course possible to decode these subtitles in the VCR at the time of recording and to record them superimposed in written form within the picture area (just as they would appear in normal viewing). This, however, has a number of disadvantages. First the viewer has to ensure that the subtitling feature is enabled at the time of recording the broadcast. Secondly, the subtitles are permanently "burnt into" the reproduced picture and hence cannot be dispensed with, which can be annoying for viewers who do not need them. Thirdly, a loss of sharpness of the subtitle text results from the limited bandwidth of the video recording/playback process. Fourthly, if recording of subtitles is requested when they are not in fact being transmitted, problems may occur in that some broadcasters may transmit a "subtitles not available" message which if "burnt-in" can obliterate picture information such as broadcast in vision subtitles.

Other data which may be usefully recorded, such as the time, date and program source, which could be obtained from the teletext service and a running total of frame count or time code could also be implemented.

The data need not, however, be in the teletext format or even transmitted during the vertical blanking interval. A possibility which has been considered is the use of available data capacity in the Nicam digital sound broadcasting services for an audio description signal. When decoded this signal provides a commentary on the picture for those having impaired sight. By recording the data from the decoder rather than the decoded audio signal, this could be selected or rejected on replay by the viewer. Clearly those without impaired sight would not wish to have this audio description signal permanently associated with the reproduced recording.

SUMMARY OF THE INVENTION

It is an object of the invention to be able to record data such as subtitles transmitted as part of the teletext service associated with a television signal on a normal domestic video recorder, such as one operating according to the VHS standard.

The invention provides a method of recording data multiplexed with a television signal on a record carrier in a video recorder, said data being recorded at a specified rate which is greater than that which can be recorded at a selected recordation by said recorder, including the steps of a) dividing a packet of said data into a plurality of data blocks, b) expanding each data block to reduce the instantaneous data rate to a data rate which can be reliably reproduced by said recorder, and c) recording the data blocks sequentially on the record carrier, each block being recorded during a line period in the vertical blanking interval of the television signal.

The recorded data may be teletext data located in one or more line periods within the vertical blanking interval of the television signal, where a packet of data corresponds to a row of standard teletext data, each data block including an expanded portion of the packet of teletext data, and the expanded data blocks are recorded on selected lines during one or more vertical blanking intervals.

By breaking the data packets into data blocks and expanding these blocks of data to occupy a longer time period, the data rate is correspondingly reduced. In the case of teletext data, a data row can be divided into a number of blocks for example 4 or 5 and each data bit expanded to occupy the space of a number of originally transmitted data bits, for example 4 data bits. Thus, a transmitted data "1" signal becomes a hexadecimal "F" while a data "0" bit becomes becomes a hexadecimal "0". In this way data transitions take place at a maximum rate of once every 4 full speed teletext data bits. This lowers the data rate and brings it well within the reproduction capability of the VHS recorder.

The teletext data may be acquired from a transmitted television signal. Alternatively the teletext data may be written onto a pre-recorded tape such as for example, pre-recorded films. Thus, it becomes possible to select subtitles from pre-recorded cassettes as well as from those recorded direct from a transmitted signal.

The recorded data may comprise teletext subtitles, for example, for the hard of hearing or viewers not familiar with the spoken language where the teletext service provides foreign language subtitles. Such data is not time limited in its usefulness, but is only required by those who are not able to comprehend the spoken language. Thus by recording the teletext data, it is not necessary to decode the teletext data at the time of recording the transmitted program and to permanently fix the subtitles in the recorded picture. This procedure also has an advantage in that the display quality of the subtitles reproduced is improved. This improvement is as a result of the direct generation of the subtitles by the character generator and its subsequent mixing with the picture signal reproduced from the tape. Thus the subtitle characters are not subject to the bandwidth limitations of recording/reproduction process.

The invention further provides a method of reproducing data recorded on a record carrier by such a method, including the steps of a) reading the data blocks from the record carrier into a temporary store, b) reading the data blocks from the temporary store and converting them to the original data packet.

The recorded data may be teletext data located in one or more line periods within vertical blanking intervals of a television signal, where a packet of data corresponds to a row of standard teletext data, the method including the steps of a) generating a teletext page header and applying it to a teletext decoder in a first line of a vertical blanking interval, b) generating a row header data block in a subsequent line of that or a subsequent vertical blanking interval and applying it to the teletext decoder, c) reading a data block from the tape and applying it to the teletext decoder during the same line as step b) is performed, d) causing the teletext decoder to store the data block as if it were a row of standard teletext data e) repeating steps b) to d) for each of a plurality of data blocks which make up a data packet, and f) converting said data blocks to produce a data packet corresponding to a row of original teletext data.

The method may further include the step of displaying the row of teletext data. Alternatively, the data packets obtained at the end of step f) in the method specified in the preceding paragraph may be used for other purposes. An example of such a purpose is the use of the teletext data packets to produce an audio description signal which could be transmitted by way of the teletext service.

The teletext data as read from the tape can thus be acquired by a standard teletext decoder. The process of generating and applying teletext page and row header signals to the decoder enables the decoder to acquire the recorded data as though they were true teletext data. Thus, the data blocks are fed into the normal teletext decoder store where they can be operated on to convert the data blocks to produce a data packet corresponding to a normal row of teletext data.

The data blocks may be stored within the teletext decoder as successive rows of teletext data, the plurality of data blocks which form a plurality of teletext rows being read from the teletext decoder to a read/write memory, the teletext rows being converted to regenerate the original teletext data packet. The teletext packet may be read back into the memory within the teletext decoder for display or other purposes.

The recorded data may include subtitle pages. Alternatively other data may be read from the record carrier, for example to give the program name, time, date and station of the original broadcast. Additionally, the data may be an audio description signal to produce an audio commentary on a recorded program which is meant to assist the visually impaired to follow visual action in a program.

The invention further relates to a video recorder including means for recording data multiplexed with a television picture signal on a record carrier, the data being received at an instantaneous data rate greater than that at which the recorder is capable of reliably reproducing said data from the carrier, said recorder including means for dividing a packet of said data into a plurality of data blocks, means for expanding each data block to reduce the instantaneous data rate to a data rate which can be reliably reproduced by said recorder, and means for recording each data block sequentially on the carrier.

The video recorder may include a teletext decoder capable of acquiring a selected page of teletext data, means for reading each row of acquired teletext data into a memory, means for dividing each row of teletext data into a plurality of data blocks, means for expanding each data block to reduce the instantaneous data rate to a data rate which the video recorder is capable of reliably reproducing and means for recording on the record carrier each expanded data block during selected line periods of one or more vertical blanking intervals.

Thus, the video recorder can use a standard teletext decoder circuit and take a data packet corresponding to a row of teletext data and expand that data into a plurality of data blocks, each of which is expanded to occupy the majority of a line period. The data blocks are then recorded on selected lines of the vertical blanking intervals. By expanding a data block to occupy the majority of a line of the vertical blanking interval, the data transition rate can be reduced to a rate which is within the frequency range of the video recorder, even a standard VHS video recorder.

Clearly such a video recorder cannot record all the teletext pages which are transmitted since there would not be a sufficient number of lines within the vertical blanking interval available to store the expanded data. Much of the transmitted teletext data, however, is ephemeral in nature and hence there is no real desire to record that data along with the program which is being recorded. However, it is possible to select, as the teletext page to be recorded, one or more subtitle pages. These subtitle pages are transmitted by the broadcasters to enable persons who are hard of hearing to read subtitles on a program to enable them to understand the dialogue or to provide a translation into a language different from that spoken in the program. This subtitle data is of course not ephemeral in nature since it directly relates to the recorded program. It is advantageous, however, if the subtitles can be recorded transparently as teletext data rather than burnt into the picture.

The video recorder may include means for generating a teletext page header and applying the page header to the teletext decoder, means for generating a plurality of row headers at the start of a corresponding plurality of line periods in the vertical blanking intervals and applying the row headers to the teletext decoder, means for reading corresponding plurality of data blocks from the record carrier and applying them to the teletext decoder in the remainder of the corresponding plurality of line periods, and means for converting the received data blocks to form an original teletext data packet. Additionally, means for applying the teletext data packet to television display apparatus for display thereof may be provided.

By generating a standard teletext page header, the teletext decoder may be alerted to acquire and decode teletext data. The generated teletext page header will have the normal teletext format whereas the succeeding teletext data read from the record carrier in subsequent line periods of vertical blanking intervals will have a lower transition rate but can be encoded as teletext data. This possibility arises because by expanding the original teletext data by integral multiples, it is possible to decode the data from the record carrier as teletext data. While this is not the originally transmitted teletext data, it is then possible to convert the data back to the original transmitted form. Thus, a standard teletext data decoder can be used both for acquiring teletext data to be recorded onto the record carrier and for recovering the data from the record carrier. All that is required is that some means is interposed between the teletext decoder and the tape record and replay to modify the data recorded and recovered from the tape.

The video recorder may including a microprocessor which communicates with said teletext decoder, said microprocessor having associated memory means and including means for reading from the teletext decoder, each acquired data block forming a teletext data row, and means for converting the data blocks to re-form the originally received or recorded teletext data packet. Means may be provided for transferring the re-formed teletext data packet to the teletext decoder.

The microprocessor may be arranged to generate a teletext page header in a pre-determined line of a vertical blanking interval.

The use of a microprocessor to generate the teletext page header and/or the row header enables the format of the page header and row header to be determined by software instructions. This enables relatively easy modification to suit different systems which may, for example, have different formats for the page header or have different data rates. It is also possible to decode low frequency data such as the systems of subtitling for the deaf known as "closed caption" subtitling in the United States of America or time codes such as generated in video cameras which may be recorded in a similar manner.

The microprocessor may be arranged to generate row headers at the start of one or more lines in the vertical blanking intervals and to apply said row headers to the teletext decoder through switch means, the microprocessor being further arranged to control said switch means to apply the data signal read from the record carrier to the teletext decoder during the remainder of the line period(s).

This enables the provision of a convenient arrangement for inserting the appropriate row headers to determine where each of the data blocks is stored within the teletext decoder before being read to a temporary store for conversion.

BRIEF DESCRIPTION OF THE DRAWINGS

The above and other aspects and advantages of the invention will become apparent from the following description of an embodiment of the invention by way of example, with reference to the accompanying drawings in which.

DESCRIPTION OF THE PREFERRED EMBODIMENTS

Figure 1:
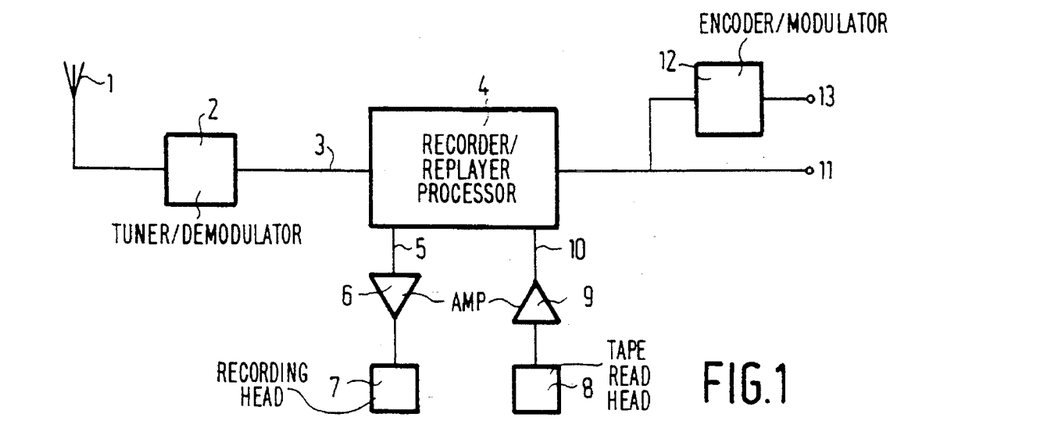
FIG. 1 is a block schematic diagram of a video recorder according to the invention.

FIG. 1 shows an embodiment of the invention in block schematic form as applied to a video cassette recorder. The video cassette recorder includes an aerial 1 which feeds a tuner/demodulator 2. The output of tuner/demodulator 2 is fed via a line 3 to a circuit arrangement 4 which is constructed and arranged to enable data to be recorded on a tape along with the usual video and audio signals. The circuit arrangement 4 has a first output 5 which is fed via an amplifier 6 to a recording head 7 of the video recorder. A tape read head 8 is connected via an amplifier 9 to a further input of the arrangement 4 over the line 10. The arrangement 4 produces an output which is fed to a SCART socket 11 and/or via an encoder and modulator 12 to an aerial socket 13.

The video recorder (VCR) may be of the standard VHS type. Such video recorders do not reliably record teletext signals as they do not have sufficient bandwidth and even S-VHS recorders, which do have sufficient bandwidth, may not reliably reproduce teletext data due to timing errors caused by head cross-over.

The arrangement 4 is fed with a combined video and blanking signal (CVBS) over the line 3 and extracts from it the teletext data. This data is extracted under the control of a microprocessor which splits a single packet of received teletext data into a number of data blocks. Normal teletext data contains 40 characters per packet, each character being defined by an 8 bit byte. In this particular embodiment, the 40 bytes are split into 5 blocks of 8 bytes. These 8 bytes are expanded by a factor of 4 before being fed to the record head of the video recorder. Thus, the instantaneous data rate is divided by 4 and falls well within the frequency range of the VHS recorder. Each packet of 8 bytes is assigned to a selected line in a vertical blanking interval and recorded on the tape.

On replay, the microprocessor within the arrangement 4 generates a dummy teletext page header at the standard teletext rate which is used to synchronise the teletext decoder and to cause it to detect the start of a page. At the start of each line on which the teletext data has been stored and is to be replayed, the microprocessor produces a row header at the standard teletext rate and timing and then the off tape data are passed to the teletext decoder which acquires them in the normal manner. As the next 4 rows are read from the tape, a different row header is generated for each row so that the teletext decoder will acquire the data contained in all the rows necessary to convert the data and assemble it into the original teletext packet. The microprocessor then converts this data into the original 8 teletext data bytes. This packet may then be passed to the output of the video recorder in the normal manner either as an RGB signal through a SCART terminal or it may be remodulated to form a normal input signal for the television receiver where a teletext decoder within the television receiver will decode the data.

Figure 2:
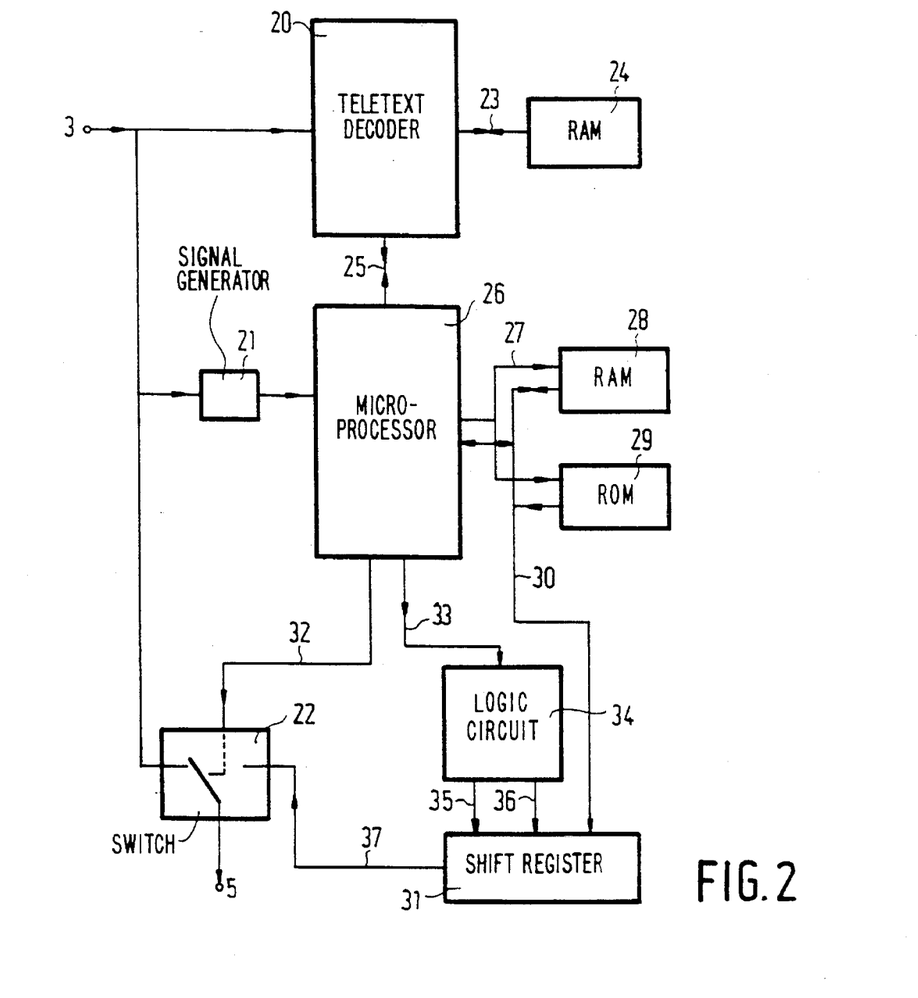
FIG. 2 is a block schematic diagram of the arrangement for acquiring, expanding, and recording teletext data onto a record carrier.
Figure 3:
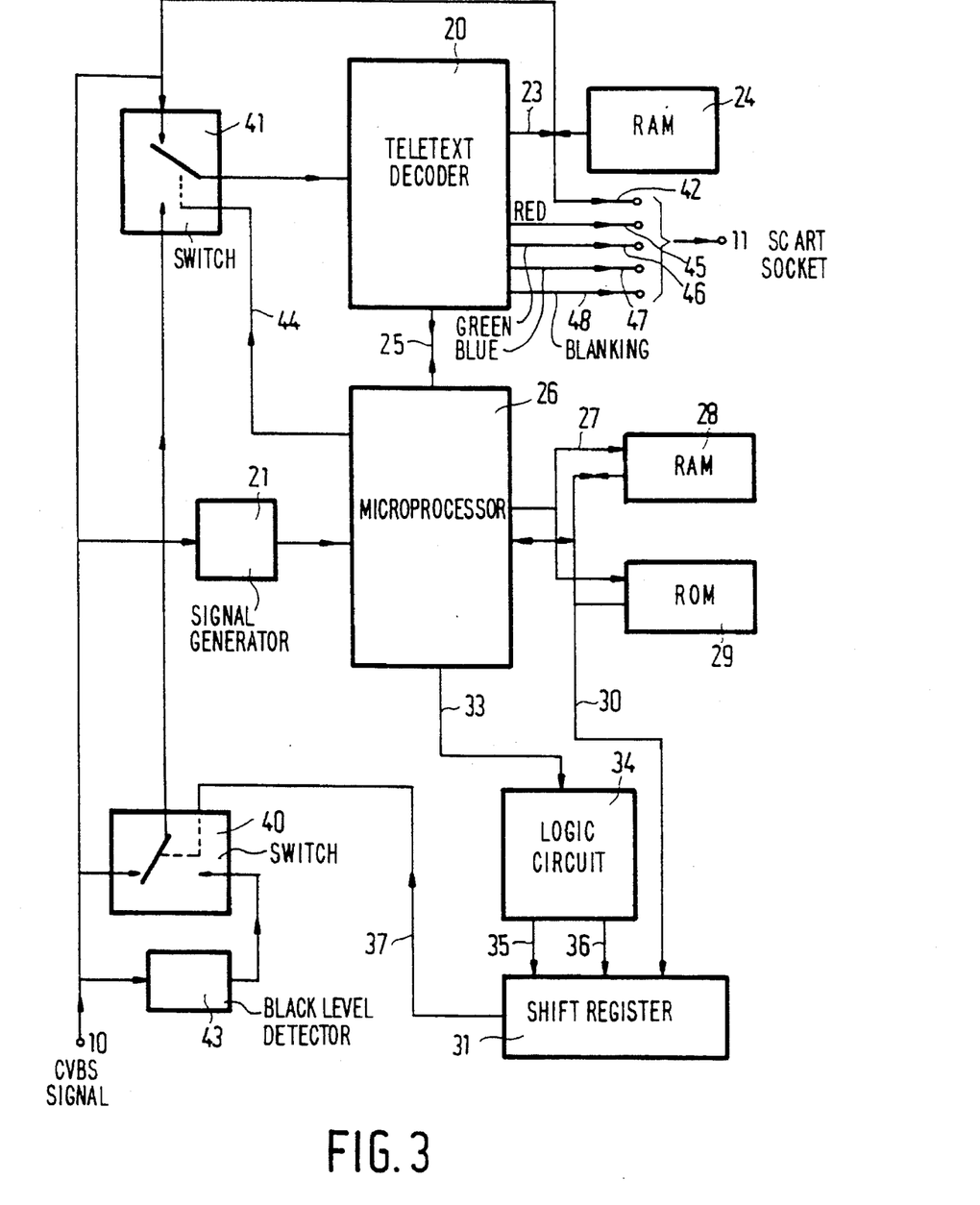
FIG. 3 is a block schematic diagram of an arrangement for recovering data so recorded from the record carrier, converting the data, and displaying it.

FIGS. 2 and 3 are block schematic diagrams of an exemplary embodiment of an arrangement 4 as shown in FIG. 1. FIG. 2 showing the arrangement configured for recording the teletext data and FIG. 3 showing the arrangement for replaying such data.

As shown in FIG. 2 the arrangement has an input 3 which is connected to a first input of a teletext decoder 20 which may be, for example, that sold by Philips Semiconductors under the type reference SAA 5246; to the input of a synchronising signal separator (SSS) 21; and to a first contact of a changeover switch 22. The teletext decoder 20 is connected via a bus 23 to a random access memory RAM 24 which is arranged for the storage of pages of teletext data. The teletext decoder is further connected via a second bus 25 to a microprocessor 26 which may be, for example, a type 8051 as sold by Philips Semiconductors. The output of the SSS 21 is fed to an input of the microprocessor 26. The microprocessor 26 has an address bus 27 which is connected to a bank of random access memory RAM 28 and to a read only memory ROM 29. The RAM 28 and ROM 29 are connected to the microprocessor 26 via a data bus 30 and also to a parallel-in serial-out shift register 31, the data bus carrying the inputs for the parallel data input to the shift register 31. The microprocessor 26 controls the operation of the switch 22 over a control line 32 and also produces outputs which are fed over line 33 to a logic circuit 34 which creates a load instruction which is fed to the shift register over a line 35 and a clock signal which is fed to the shift register 31 over a line 36. The serial output of the shift register 31 is fed via a line 37 to a second contact of the switch 22. The common contact of the switch 22 is fed to the output 5 for application to the tape record head via the amplifier 6.

The combined video and blanking signal (CVBS) is fed via the switch 22 to the record head when there is no data which is to be recorded. Thus, during all the active line periods of the picture and all synchronising pulses, the switch 22 is in the position shown and is only changed over when it is desired to record expanded data on the tape. When teletext signals are to be recorded the microprocessor 26 causes the teletext decoder to acquire the selected page. When the teletext decoder 20 has acquired the selected page and stored it in the RAM 24, the microprocessor 26 accesses the stored page and the page data is transferred to the microprocessor via the bus 25 which is, for example, an I²C bus. Each valid row of the page is expanded to occupy 5 lines in the vertical blanking interval and is transferred via serial output of the shift register 31 to the output 5, the switch 22 being controlled by the microprocessor 26 over the control line 32 to connect the data from the serial output of the shift register on line 37 to the output 5. Consequently these 5 lines of data substitute for 5 lines of the original CVBS signal during the blanking interval. The resulting CVBS signal containing the new lines is then recorded on VHS tape using standard techniques.

The microprocessor 26 may operate with a master clock oscillator having a frequency simply related to the teletext data bit rate, for example 1.5 or 2 times. By appropriately choosing such a relationship, data for controlling the operation of the microprocessor (the program code) and data to be applied to the output as a teletext format signal via the shift register 31 may be stored in the same memory (RAM 28) and may share the same data bus (data bus 30).

This construction enables the continuous stream of program operating instructions (op-codes) transferred from the RAM 28 which may be a code RAM or CRAM to the microprocessor 26 over the data bus 30 as a result of requests by the microprocessor 26 via the address bus 27 to contain within them the data required by the shift register to produce the lower rate data in the recording mode for passing to the output 5 and to produce the full rate page and row header data in the replay mode for passing to the teletext decoder 20. By using appropriately chosen op-codes and control pulses for the shift register 31, generated by the microprocessor 26 and a logic circuit 34, each device, i.e. microprocessor 26 and shift register 31, will respond only to the data which is intended for its use and will ignore the data intended for the other device.

The arrangement may operate to generate teletext data using a synchronous "semi-DMA" (direct memory access) technique to achieve a high data throughput (one byte per machine cycle) with minimum hardware. The microprocessor 26 controls the address lines, but data from the memory is strobed directly into the input buffer of the shift-register 31. The method of operation is that a section of the RAM 28 is specially written with alternating opcodes and the data to be sent. The opcodes are effectively non-computational and may be the first byte of any two-byte instruction which does not affect the program flow or function. To transmit the data, the microprocessor 26 reads the first opcode byte and then increments to read the following data byte, but in addition a pulse produced by the logic circuit 34 strobes the same data into the shift register buffer. Since the opcode specified a two byte instruction, the processor increments to the next non-computational opcode and continues until a "genuine" code terminates the transmission.

Operating the microprocessor 26 at a frequency simply related to the teletext data rate has the advantage that the design of the logic circuit 34 is simplified as the shift register 31 can be almost directly controlled by the microprocessor 26 since their operation is synchronised, i.e. the clock rate of the shift register has a simple relationship with the microprocessor clock.

Figure 4A:
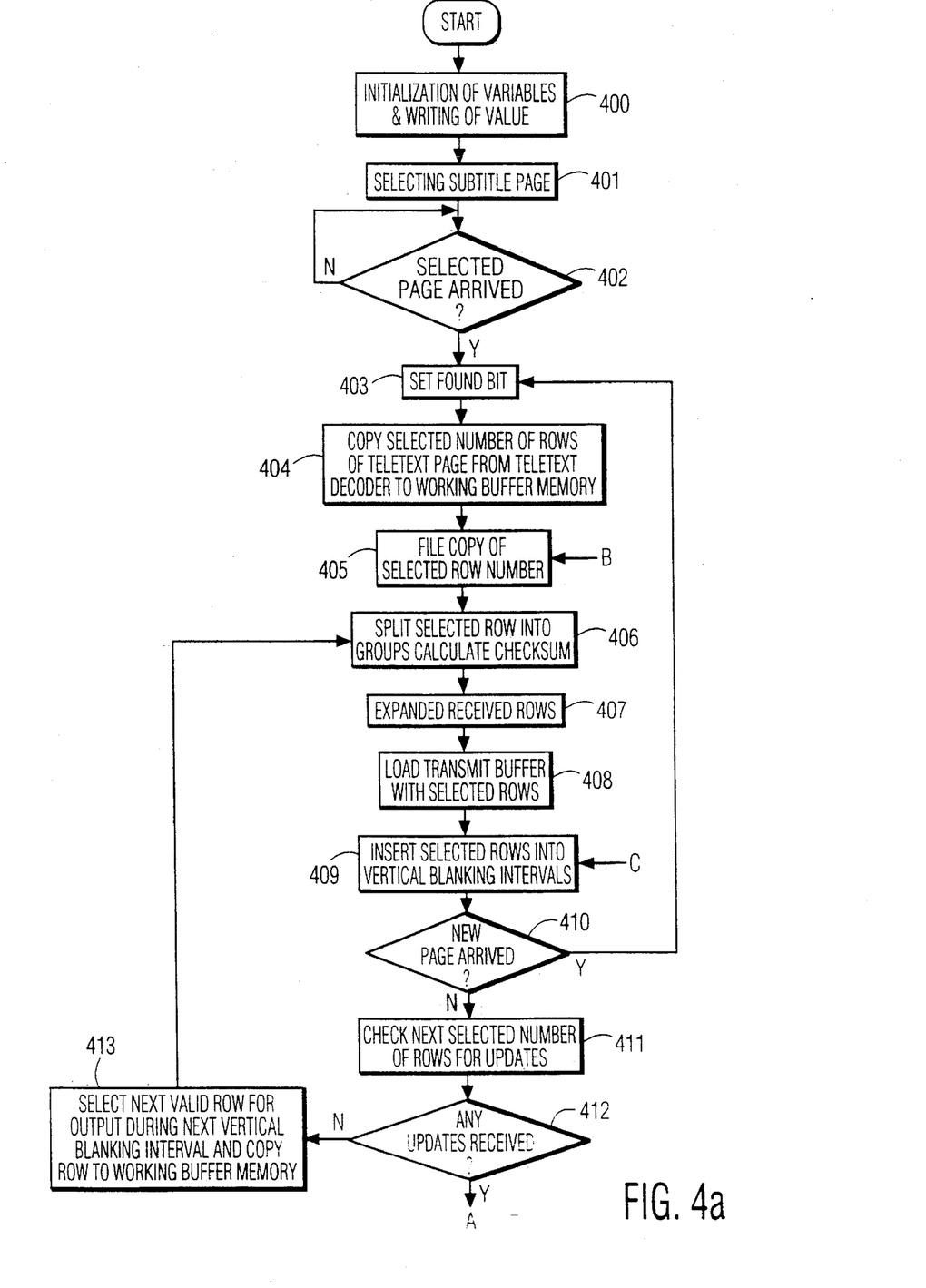
FIGS. 4a and 4b are a flow diagram illustrating a method of recording data on a record carrier according to the invention.
Figure 4B:
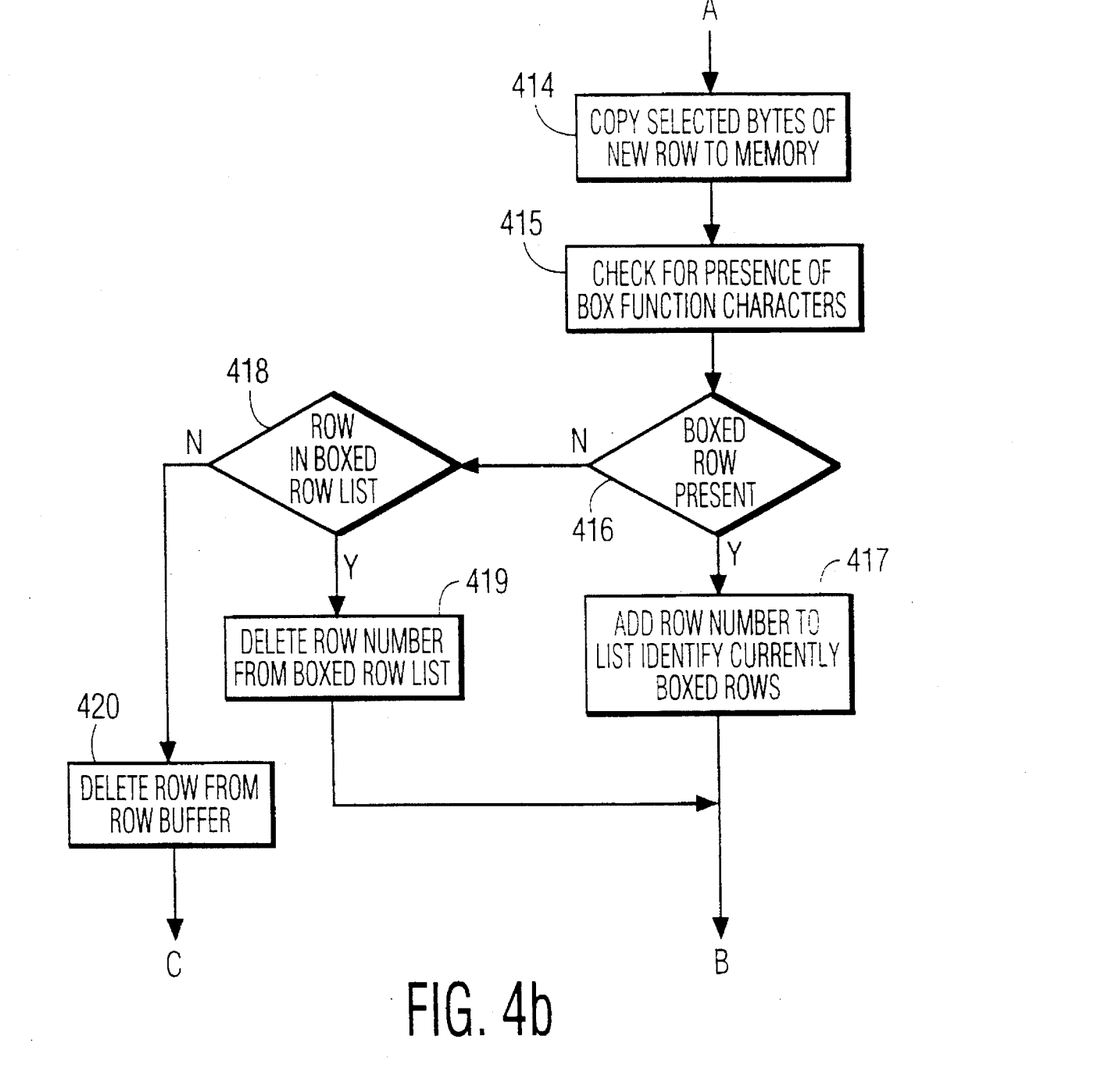

FIGS. 4a and b combine to form a flow diagram illustrating the process of recording the received teletext data on the tape. Box 400 represents an initialization process in which a number of variables are initialized and a particular value is written into column 39 of each display row in selected acquisition chapter in the teletext decoder to enable detection of newly received teletext rows. Box 401 represents the step of selecting the subtitle page to cause the teletext decoder to acquire the subtitle page when it is transmitted. Box 402 represents a test to determine whether the selected page has arrived. If the teletext decoder is of the type SAA 5246 sold by Philips Semiconductors then the check of whether a page has arrived may be performed by monitoring the "found" bit in the appropriate acquisition chapter of the teletext decoder. Box 403 represents the step of setting the "found" bit in the acquisition chapter to enable detection of the next arrival of a page, the arrival of a page being indicated by resetting the "found" bit. Box 404 represents the copying of row 0 of a teletext page from the teletext decoder to a working buffer memory within the processor memory 28. The content of row 0 is not, however, a direct copy of header row bytes 0 to 39 of the acquisition chapter. It is necessary to identify explicitly the received page. In order to do this, bytes 0 to 7 of row 25 (page status data) are copied as the first 8 bytes of row 0. The remainder of row 0 includes a copy of bytes 8 to 32 of the original received row 0. In this embodiment, the time portion of the row is not copied as it is irrelevant and it is desirable to limit the amount of data transferred via the I²C bus as it has limited data transfer speed. The next step represented by box 405 is to file a copy of the row for later cycling, that is when all rows have been processed and output but before a new page arrives, the present page may be repeatedly inserted in the vertical blanking intervals to protect against data loss due to, for example tape drop-outs.

The next stage is an error protection step and includes a process of splitting the row into five 8 byte groups and calculating an 8 bit check sum for each group, Box 406. The check sum is inserted into the group using the spare most significant bit of each byte of the group, that is the bit which was originally the parity bit of the transmitted teletext signal. The check sum is equal to the modulo 256 addition of all 8 bytes of the group plus the original row number. The next step, box 407, is to expand the received row to five rows for recording. The five 8 byte groups are expanded into five 32 byte groups for recording. Each original bit is coded into 4 bits. 0 becomes 0000 and 1 becomes 1111. Each 32 byte group is prefixed with 7 bytes which comprise an expanded row number and expanded framing code. This produces a group which is now 39 bytes in length. An additional zero value byte is added at the end which acts as a data guard interval for software timing tolerances during replay. The final group length is then 40 bytes and makes up the recorded teletext row. Five such rows are used to record one original teletext row. The next step, box 408, is to load a transmit buffer with the five rows, that is the five 40 byte groups which make up a single teletext row as originally transmitted.

The next step, Box 409 is to cause the five rows to be inserted in the vertical blanking interval(s). Having loaded the transmit buffer the microprocessor 26 waits for a field synchronising pulse and then counts a required number of line synchronising pulses. In each of the selected insertion lines the microprocessor 26 causes a reference logic "1" level to be inserted for a predetermined period, for example 5 byte periods, and then causes the transfer of the 40 byte data group described above via the shift register 31. During the active period of these selected lines, the switch 22 is operated to pass the signal on line 37 to the output 5. The selected lines need not be successive lines nor be in the same vertical blanking interval. The actual lines selected will depend on whether any other data signals, for example time codes, are required to be recorded on the tape during the vertical blanking interval, and thus, how many and which lines are available during each vertical blanking interval.

The next step, Box 410, is to check whether a new page has arrived. This is carried out by inspecting a state of a page found flag in the teletext decoder. If a new page is detected then the procedure reverts to the step 403 and sets the found bit in the teletext decoder. If no new page has been found then the procedure is to check the next five display rows for updates, Box 411. This check is made to determine whether any newly received rows are present. In the embodiment shown in FIG. 2, the complete set 1–23 of display rows cannot be checked in one pass as it takes too much time to transfer the information over the I²C bus having regard to the time necessary to process and prepare a new row for output prior to the next vertical blanking interval. Box 412 denotes the decision as to whether any updated rows have been received. When no rows have been updated the next step, Box 413, is to select the next valid row for output during the next vertical blanking interval and this row is copied from the file buffer to the working buffer ready for subsequent processing.

If any updated rows are present then the next step, Box 414, is to copy bytes 0 to 39 of the new row from the teletext decoder via the I²C bus to the processor memory. The next step, box 415 is to check for the presence of "box function" characters. The row is scanned for a sequence of two consecutive "box on" characters. This denotes that the row contains characters that would be displayable as part of a sub-title page. Characters present within a row but not prefixed by two "box on" characters are not displayed in normal teletext sub-title page display mode. Consequently, for the purposes of processing efficiency during recording, rows not containing two consecutive "box on" characters may be excluded from further processing even though they may have been transmitted as part of the original sub-title page. The original sub-title page may include rows containing spaces and rows containing just meaningless characters. If the decision, Box 416, as to whether a boxed row is present, is yes, then the row number is added to a list which identifies which rows are currently boxed, Box 417. This boxed row list is used as a way to identify the subsequent erasure of a boxed subtitle row when substituted by a non-boxed row, for example a row of spaces. The current row is then copied from the working buffer into the file buffer, box 405.

If the decision was made that no box was present in the row then a further decision Box 418 is taken as to whether the row was in the boxed row list. If this was the case then the row number is deleted from the boxed row list, Box 419. This normally occurs due to an overwrite by a non-boxed version of the row as a means of erasing the row from the display. After having deleted the row number from the boxed row list the row is then read into the file buffer Box 405. If the row was not in the boxed row list then the row is deleted from the row buffer, Box 420, thus the row is removed from the filed store of rows and will subsequently not be cycled and recorded while waiting for a new page. As a result the current loaded expanded rows will be applied to the record head again during a subsequent vertical blanking interval period, Box 409.

FIG. 3 shows the arrangement 4 in its replay mode, that is set to read the teletext data from the tape, to decode the teletext data, and to pass it for display to the television receiver. In FIG. 3 those elements common to those shown in FIG. 2 are given the same reference numerals. An advantage of the invention is that it is possible to produce embodiments where much of the hardware used for recording the data can be used again in the replay process giving an economic hardware design and thus, minimizing hardware cost. The CVBS signal read from the tape by the playback head is received over line 10 and is connected to one contact of a first changeover switch 40, to one contact of a second changeover switch 41, and to a terminal 42. It is also connected to the input of a black level detector 43, the output of which is connected to the other contact of first changeover switch 40. The pole of the changeover switch 40 is connected to the other contact of the switch 41. The switch 40 is controlled by the signal from the serial output of the shift register 31 over the line 37, while the switch 41 is controlled by the microprocessor 26 over a control line 44. The pole of switch 41 is connected to the input of the teletext decoder 20. The teletext decoder 20 has 4 outputs 45, 46, 47 and 48 which provide red, green and blue and blanking signals for connection to a television set. The outputs 42, 45, 46, 47 and 48 are combined as output 11 which would be connected to a television set normally through a SCART socket. Alternatively, as is known, these signals could be re-encoded and modulated and fed to the normal aerial input socket of a television receiver, or could be re-inserted in the CVBS for connection to the television receiver via a SCART socket.

The overall operation of the replay mode can be summarized as follows. The recorded data which is read from the tape is acquired by the teletext decoder 20 using synthesised page header and row headers generated by the processor 26. However, due to timing errors in the replay process, the transitions may no longer occur on the nibble boundaries. The software, therefore, is arranged to identify the approximate locations of the transitions relative to the data byte boundaries and bit-shift the data back to the original nibble boundaries so that these nibbles can be converted back to single bits.

The acquired data includes display rows 1 to 5 each row containing 8 bytes of the original teletext row. Each row is copied in turn from the teletext decoder/acquisition memory 24 to processor working memory. The row is converted back to 10 bytes and the check is made for the presence of framing code. If the framing code is absent the whole original 40 bytes are shifted right by one bit within the processor working memory and the check for the framing code is repeated. Once the framing code is found, the row check sum is calculated and compared to that sent. The original 40 bytes are shifted again if this comparison fails. Once the framing code and check sum tests are passed, the original 8 row bytes are copied to a display row buffer. This buffer is loaded in turn with the remaining 32 bytes from the next four rows read from the tape. The complete 40 byte buffer is then copied to the appropriate teletext decoder display chapter row via the I²C bus 25. The process then ends to allow the processor to generate synthesized teletext headers to acquire more off tape data during the next vertical blanking interval period.

Figure 5:
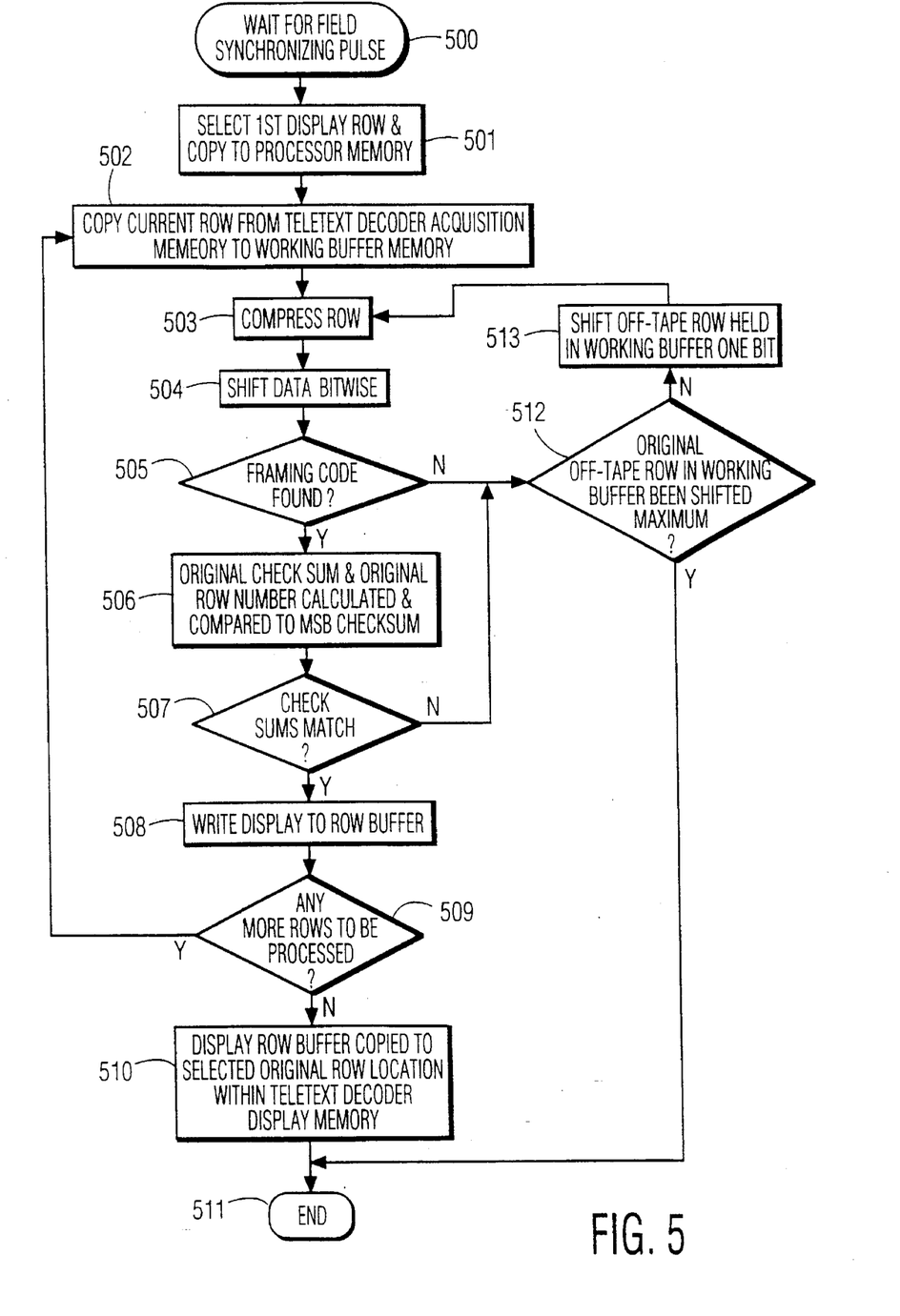
FIG. 5 is a flow diagram of a method of recovering this data from a record carrier and converting it according to the invention.

FIG. 5 is a flow diagram illustrating the generation of a teletext packet for display from the teletext data acquired from the tape. The off-tape data is always acquired by the teletext decoder in acquisition chapter rows 1 to 5 defined by the synthesised row headers generated by the processor. The first step is to wait for a field synchronising pulse and then start processing the data, box 500. The second step, box 501, is to select the first display row for copying to the processor memory. The third step, box 502 is to copy the current row from the teletext decoder acquisition memory to a working buffer memory within the processor memory. This row is then compressed, Box 503, by converting the current 40 byte row into 10 bytes by compressing each nibble, that is each successive group of four bits, to one bit according to the following table.

| Nibble Value | Bit Value |
|---|---|
| 7 | 1 |
| F | 1 |
| E | 1 |
| All other values | 0 |

The synthesised teletext page and row header data are generated by the microprocessor 26 and read from the code RAM 28 to the parallel inputs of the shift register 31 over the data bus 30. The microprocessor generates a signal over the control line 44 to the switch 41 which causes the switch 41 to change its state and connect the input of the teletext decoder to the pole of the switch 40. The state of the switch 40 is controlled by the serial output of the shift register 31 over the line 37 and switches between black level which is produced at the output of the black level detector 43 and the reference peak data level, which has been added to the CVBS signal during the relevant part(s) of the vertical blanking interval. Thus, the input to the teletext decoder will be switched between the black and reference peak data levels at the appropriate data rate and produce synthesized data. The synthesized data levels thus have the same amplitude as the data recorded on the tape and furthermore, the possibility of valid data row headers being generated on lines which do not contain the reference level associated with the expanded data format is reduced. The microprocessor is arranged to clock the shift register 31 at the standard teletext data rate so that the data received by the teletext decoder will be at the standard teletext data rate. This generates the page and row headers and thus enables the teletext decoder to subsequently acquire the data from the tape during the vertical blanking intervals. The data from the tape is expanded at a time multiple of the teletext data period, so that, for example, a single data bit from the tape is effectively four data bits of the normal teletext signal long. Thus, transitions generally do not take place at intervals less than four clock periods of the teletext data clock. The expanded data on the tape being is a nibble four bits long which takes the value either all 1's or all 0's. These single bits are then assembled to form the teletext character bytes.

The next step, box 504, is to shift the 10 bytes bit wise in an attempt to find the framing code byte. If the framing code is found, box 505, then the check sum from the original 8 row bytes, plus original row number are calculated and the result compared with the check sum sent in the most significant bits of the 8 original bytes, Box 506. If the check sums match, Box 507, then the 8 bytes of the received row are written to a part of the processor memory allocated as a display row buffer, Box 508. A check is then made to see whether there are any more rows remaining to be processed in the acquisition memory of the teletext decoder Box 509, and, if so, the next row is read from the teletext decoder memory into the processor memory and the steps from box 502 onwards are repeated. As a result, the display row buffer is eventually loaded with processed original teletext row bytes decoded from the five teletext rows received from the tape. Each row read from the tape contributes 8 bytes to the buffer, the position of the bytes within the buffer being dictated by from which off-tape row they were decoded. When there are no more rows, the data in the display row buffer is copied via the $I^2C$ bus to the appropriate original row location within the teletext decoder display memory, Box 510. This is one original subtitle row display and is thus available for display on a television receiver in the normal manner. This process then ends, Box 511, to allow the processor to generate synthesised teletext headers during the next vertical blanking interval period to acquire more off-tape data. When this happens, this process is entered once again during the vertical blanking interval, block 500, to process the acquired data.

If, when the check for the frame code, Box 505, reveals that the frame code has not been found, or when the calculated and received checksums do not match, Box 507, then a check is made to ascertain whether the original off-tape row in the working buffer has been shifted right a maximum of 7 bit positions, Box 512. If the answer is no then the 40 byte off-tape row held in the working buffer is shifted right by one bit, Box 513, and the process is re-entered at Box 503. If the answer is yes then the process ends, Box 511, as a teletext row has not been correctly decoded and the next vertical blanking interval is awaited to restart the process.

This technique allows the use of a standard teletext decoder to record and recover transparently selected teletext data, that is hidden within the video signal, using a basic domestic video cassette recorder of the VHS type. This enables the provision of the following benefits. It is possible to program the microprocessor so that when there are subtitles they are automatically recorded transparently on tape, that is when recording a program it is unnecessary for the viewer to specifically select the subtitling. Consequently, it is possible to prevent errors of forgetting to enable the recording of the teletext subtitles. Conversely, where a broadcaster transmits a non-useful subtitle caption, for example to indicate the non-availability of the subtitling service, then such information is still recorded but need only be superimposed on the picture at the discretion of the viewer at the time of replay. This has a clear advantage over a system which permanently superimposes the decoded teletext subtitles onto the picture at the time of making the recording.

Another benefit from this method of recording text on the tape exists, in particular, for subtitles. The clarity of the displayed subtitle on replay is the same as for a live TV broadcast. As a result, RGB quality can be obtained. This has the important benefit of a clear display helping the user to read text off the screen more easily. In addition, the subtitles could also be made available on pre-recorded tapes of films using this technique. These subtitles could be either for the hard of hearing or could be foreign language subtitles which can be selected or not depending on the user's need for the subtitles. As well as subtitles, other information could be recorded on the tape, for example, recording date or time, channel, program title and so on which could be displayed by the viewer. Clearly, this technique cannot be used for real time recording of complete teletext data as there would not be the room for the expanded data on the lines of the vertical blanking interval. However, as has been mentioned before, much of this information is ephemeral in nature. For example, weather forecasts or travel information of several months ago are of little interest when viewing a recorded program, and only the limited information which is specifically relevant to that program needs to be recorded.

From reading the present disclosure, other modifications will be apparent to persons skilled in the art. Such modifications may involve other features which are already known in the design, manufacture and use of video recorders including teletext decoders and/or other data recorders and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of reproducing data recorded on a record carrier in a video recorder, said data having a nominal data rate which is greater than a data rate at which said video recorder can reproduce at a selected quality level, the recorded data being encoded according to a teletext data format and being located in at least one line period within vertical blanking intervals of a television signal, said data including a plurality data packets, each data packet corresponding to a row of standard teletext data and each data packet being divided into a plurality of data blocks, each data block being expanded to reduce a corresponding data rate to a data rate which said recorder can reproduce at said selected quality level and being located in a separate line of a vertical blanking interval, the method including the steps of:

a) generating a teletext page header data packet and applying the teletext page header data packet to a teletext decoder in a first line of a vertical blanking interval;

b) generating a row header in a subsequent line of the vertical blanking interval or a subsequent vertical blanking interval and applying the row header to the teletext decoder;

c) reading a data block from a tape and applying the data block to the teletext decoder during the subsequent line of the vertical blanking interval in which step b) is performed;

d) causing the teletext decoder to store the data block as if the data block were a row of standard teletext data;

e) repeating steps b) to d) for each data block of the plurality of data blocks of a corresponding data packet of the plurality of data packets; and f) converting said plurality of data blocks to produce a data packet corresponding to an original row of teletext data.

2. A method as claimed in claim 1, further comprising the step of displaying the row of teletext data.

3. A method as claimed in claim 1, wherein the teletext data comprises subtitle pages.

4. A method as claimed in claim 1, wherein:

the data blocks are caused to be stored within the teletext decoder as successive rows of teletext data;

the plurality of data blocks which form a teletext packet are read from the teletext decoder to a read/write memory;

the teletext packet is converted to produce an original row of teletext data; and teletext characters are read back into the memory within the teletext decoder.

5. A method as claimed in claim 4, wherein the original teletext data is written into the memory within the teletext decoder.

6. A method as claimed in claim 4, wherein the original teletext data is written into a display memory.

7. A method as claimed in claim 4, wherein the original teletext data is re-encoded as a teletext signal in a vertical blanking interval.

8. A video recorder for recording data on a record carrier, the data being received at a nominal data rate greater than that at which the video recorder is capable of reproducing, said data from the record carrier at a selected quality level, said video recorder including:

a teletext decoder capable of acquiring a selected page of teletext data, the selected page having at least one data packet which define rows of the selected page;

means for dividing each data packet of the at least one data packet into a plurality of data blocks;

means for expanding each data block of the plurality of data blocks of a respective data packet to reduce the nominal data rate to a data rate at which the video recorder is capable of reproducing at a selected quality level;

means for recording each data block sequentially on the record carrier;

means for generating a teletext page header and applying the teletext page header to the teletext decoder;

means for generating a plurality of row headers at a start of a corresponding plurality of line periods in the vertical blanking interval and applying the row headers to the teletext decoder;

means for reading corresponding pluralities of data blocks from the record carrier and applying the corresponding pluralities of data blocks to the teletext decoder in the remainder of corresponding plurality of line periods; and means for converting the received data blocks to form an original teletext data row.

9. A video recorder as claimed in claim 8, wherein the selected teletext page is a subtitle page.

10. A video recorder as claimed in claim 8, further comprising means for applying the teletext data packet to television display apparatus for display thereof.

11. A video recorder as claimed in claim 10, wherein the selected teletext page is a subtitle page.

12. A video recorder as claimed in claim 8, comprising means for recording a reference level for the teletext page header and/or row header on the record carrier.

13. A video recorder as claimed in claim 12, wherein the page and/or row header is generated by switching between the reference level and a black level of the signal reproduced from the record carrier.

14. A video recorder as claimed in claim 8, further comprising a microprocessor which communicates with said teletext decoder, said microprocessor having associated memory means, said microprocessor comprising:

means for reading from the teletext decoder, each acquired data block forming a teletext data row;

means for converting the data blocks to re-form the originally received or recorded teletext data packet; and means for transferring the re-formed teletext data packet to said teletext decoder.

15. A video recorder as claimed in claim 14, wherein the microprocessor is arranged to generate a teletext page header in a predetermined line of a vertical blanking interval.

16. A video recorder as claimed in claim 15, wherein the microprocessor is arranged to generate row headers at a start of one or more lines in a vertical blanking interval and to apply said row headers to the teletext decoder through switch means, the microprocessor being further arranged to control said switch means to apply a data signal read from the record carrier to the teletext decoder during the remainder of the corresponding plurality of the line period(s).

* * * * *